United States Patent
Neilsen et al.

(10) Patent No.: US 8,054,768 B2
(45) Date of Patent: Nov. 8, 2011

(54) METHOD AND SYSTEM FOR TRANSMISSION OF SIGNALS TO NODES IN A SYSTEM

(75) Inventors: Martin Sandal Neilsen, Norre Nebel (DK); Erik Bundsbaek Mouridsen, Skjern (DK); Henning Sorensen, Lem (DK); Jakob Trelborg, Hemmet (DK)

(73) Assignees: Homecontrol A/S (DK); Somfy SAS (FR)

( * ) Notice: Subject to any disclaimer, the term of this patent is extended or adjusted under 35 U.S.C. 154(b) by 732 days.

(21) Appl. No.: 12/042,859

(22) Filed: Mar. 5, 2008

(65) Prior Publication Data

US 2008/0151858 A1  Jun. 26, 2008

Related U.S. Application Data

(63) Continuation of application No. 10/500,625, filed on Feb. 4, 2005, now Pat. No. 7,346,016.

(51) Int. Cl.
*H04J 3/00* (2006.01)
*H04M 3/00* (2006.01)

(52) U.S. Cl. ........ 370/310; 370/336; 370/345; 455/352; 455/420

(58) Field of Classification Search ............... 370/293, 370/321, 315, 345, 349, 336–337, 390, 392; 455/7, 11.1, 13.1, 41.1–41.3, 66.1, 418–420, 455/507, 509; 340/853.1, 853.7
See application file for complete search history.

(56) References Cited

U.S. PATENT DOCUMENTS

| | | | |
|---|---|---|---|
| 5,454,077 A | | 9/1995 | Cheron |
| 5,530,963 A | * | 6/1996 | Moore et al. ................ 709/243 |
| 5,588,002 A | | 12/1996 | Kawanishi et al. |
| 5,815,086 A | * | 9/1998 | Ivie et al. ................ 340/825.52 |
| 6,018,516 A | * | 1/2000 | Packer ........................ 370/231 |
| 6,026,150 A | * | 2/2000 | Frank et al. ............... 379/90.01 |
| 6,424,248 B1 | * | 7/2002 | Toms et al. .................. 340/3.51 |
| 6,741,600 B1 | * | 5/2004 | Weiss et al. .................. 370/404 |
| 6,775,258 B1 | * | 8/2004 | van Valkenburg et al. .... 370/338 |
| 6,798,350 B2 | * | 9/2004 | Maxit et al. ............... 340/853.3 |
| 2004/0070516 A1 | | 4/2004 | Nielsen |

FOREIGN PATENT DOCUMENTS

EP  0513443 A1  11/1992

(Continued)

OTHER PUBLICATIONS

Partial English Translation of JP 05-50889.

(Continued)

*Primary Examiner* — Simon D Nguyen
(74) *Attorney, Agent, or Firm* — Cantor Colburn LLP (57) ABSTRACT

Method of and system for transmitting signals, e.g. control signals, request signals, interrogation signals etc. to a node in the form of a controllable unit associated with a device, e.g. a controllable device, measuring means, etc. and wherein said controllable unit may be linked to at least one further node by means of a communication bus, at least one of said nodes comprising radio frequency receiving means, said method comprising the steps of a) transmitting a signal from a controller, b) reception of said signal by at least said node comprising radio frequency receiving means, c) detection of at least part of said signal indicating a destination node, and d) retransmittal of said signal or part of said signal by said more comprising radio frequency receiving means to said destination node via said communication bus.

28 Claims, 6 Drawing Sheets

FOREIGN PATENT DOCUMENTS

| | | |
|---|---|---|
| JP | 5050889 | 3/1993 |
| JP | 05-50889 | 7/1993 |
| JP | 6062012 | 3/1994 |
| KR | 19990004349 | 1/1999 |
| WO | 9604734 | 2/1996 |
| WO | 0217560 A2 | 2/2002 |

OTHER PUBLICATIONS

Full English Machine Translation of JP 05-50889.

English language abstract of CN1250983, published Apr. 19, 2004, which claims priority to U.S. Patent No. 5,530,963.

Tsang P W M et al: "Development of a Distributive Lighting System Using Local Operating Network", IEEE Transactions on Consumer Electronics, IEEE Inc. , Nov. 1994, vol. 40, No. 4, 1., pp. 879-889, New York, US.

"Networking the Intelligent Home", Hanover G., IEEE Spectrum Oct. 26, 1989, pp. 48-49.

* cited by examiner

METHOD AND SYSTEM FOR TRANSMISSION OF SIGNALS TO NODES IN A SYSTEM

CROSS-REFERENCE TO RELATED APPLICATIONS

This application is a continuation of and claims the benefit of U.S. patent application Ser. No. 10/500,625 filed on Jun. 30, 2004, which itself claims the benefit of PCT Application No. PCT/DK02/00007 filed on Jan. 3, 2002, both applications being incorporated herein in their entirety.

FIELD OF THE INVENTION

The invention relates to a method of transmitting signals, e.g. control signals, request signals, interrogation signals etc. to a node in the form of a controllable unit associated with a device, e.g. a controllable device, measuring means, etc.

The invention further relates to a system for transmission of signals, e.g. control signals, request signals, interrogation signals etc. to a node in the form of a controllable unit associated with a device, e.g. a controllable device, measuring means, etc.

BACKGROUND OF THE INVENTION

Systems for transmitting signals, e.g. controls signals to controllable devices such as openers for doors, gates, windows etc. have been provided in the form of wired control systems. Such a system, however, lacks user friendliness because the set up is inflexible, e.g. the use of mobile remote controls will not be possible.

Wireless systems have been provided, e.g. using radio frequency signals, infra red signals etc, whereby enhanced user friendliness may be provided, e.g. by using wireless remote controls. However, such wireless solutions have a number of disadvantages; for example, a transmitted control signal may not always be received by the intended controllable device, e.g. because of less than optimal transmission circumstances, shielding effects caused by walls and other structures, etc.

BRIEF SUMMARY OF THE INVENTION

The invention is generally directed to a method and a system for transmission of signals to control various devices regardless of surrounding walls and structures.

A method and a system for transmission of signals according to an aspect of the invention integrate control systems comprising a plurality of controlled units using both wireless and wired connection.

A method and a system of the invention prioritize operations related to the controlled units comprised in the system.

More particularly, the invention relates to a method of transmitting signals, e.g. control signals, request signals, interrogation signals etc. to a node in the form of a controllable unit associated with a device, e.g. a controllable device, measuring means, etc. in which the controllable unit may be linked to at least one further node via a communication bus, at least one of the nodes including radio frequency receiving means. Steps of the method include:
transmitting a signal from a controller,
receiving the signal by a node having radio frequency receiving means,
detecting at least part of the signal indicating a destination node, and
retransmitting the signal or part of the signal by the node having radio frequency receiving means to a destination node via a communication bus.

According to another aspect of the invention, the method can include a procedure for determining a timeslot in which the retransmittal introduced above may be performed by the node comprising radio frequency receiving means.

According to a further aspect, the procedure for determining a timeslot may comprise a random selection of a timeslot.

The signal in the foregoing aspect may be received by at least two nodes comprising radio frequency receiving means and the retransmittal may be performed by the node for which the earliest occurring timeslot has been selected. At least part of the signal indicating a destination node may comprise an identification of the destination node, for example, an address.

The retransmittal step of the received signal may be performed via a wired communication bus.

Advantageously, the signal may be transmitted to the node comprising radio frequency receiving means via a wireless remote control.

According to a further aspect of the invention, the method can include transmittal of a response signal from the destination node, the response signal being transmitted via the communication bus and via the node have transmitted the signal to the controller having transmitted the signal, e.g. routing the response signal corresponding to the routing of the signal.

The invention also relates to a system for transmission of signals, e.g. control signals, request signals, interrogation signals etc. to a node in the form of a controllable unit associated with a device, e.g. a controllable device, measuring means, etc. in which the controllable unit may be linked to at least one further node via a communication bus in which at least one of the nodes comprises radio frequency receiving means for reception of signals transmitted from at least one controller in the system and in which at least one node comprising radio frequency receiving means for reception of signals have means for retransmitting of a received signal or information comprised herein via the communication bus.

The system can include a plurality of nodes in the form of controllable units, each associated with a device, and the system can include one or more communication buses, each defining a subnet in the system and each being linked to at least one of the nodes comprising radio frequency receiving means.

The nodes can have identification means, e.g. means for storing an address, for example, and means for identifying an identification part of a received signal.

The at least one node radio frequency receiving means can have means for initiating a re-transmittal of a received signal or part hereof, e.g. in case of reception of a signal with an identification part different from the identification of the node in question.

Moreover, the at least one controller can include remote control means for transmission of the signals to one or more of the nodes comprised in the system.

In a further aspect of the invention, the communication bus can include a communication channel operating via wired connections.

Additionally, the at least one of the nodes comprising radio frequency receiving means can include means for establishing and storing a table comprising identification of destination nodes linked by a communication bus, e.g. comprised in a subnet of the system.

Still further, the nodes can include power supply means, preferably connected to a plurality of the nodes via a power supply line.

The communication bus can also include a communication channel operating via the power supply line, e.g. by means of a modulation technique, superimposing technique etc.

In yet another aspect of the invention, at least one of the nodes on the subnet can include control means for performing a general control of simultaneously and/or sequentially performed operations by the devices involved in the system, e.g. in order to prioritize operations in consideration of certain resources such as available power etc., the control means having means for keeping account of available resource(s), means for accepting or denying requests from nodes on the subnet, means for aborting current operations of the nodes and/or means for valuating requests and/or current operations in view of a priority value.

Additionally, the radio frequency receiving means may be designed as transceiver means, e.g. in order to respond to received signals.

BRIEF DESCRIPTION OF THE DRAWINGS

The invention will be explained in further detail below with reference to the figures in which.

DETAILED DESCRIPTION

Detailed reference will now be made to the figures in which examples embodying the present invention are shown. Repeat use of reference characters in the present specification and figures is intended to represent same or analogous features or elements of the invention unless otherwise indicated herein.

The drawings and the following description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations thereof. The present invention thus includes modifications and variations of the following examples as come within the scope of the amended claims and their equivalents.

Figure 1:
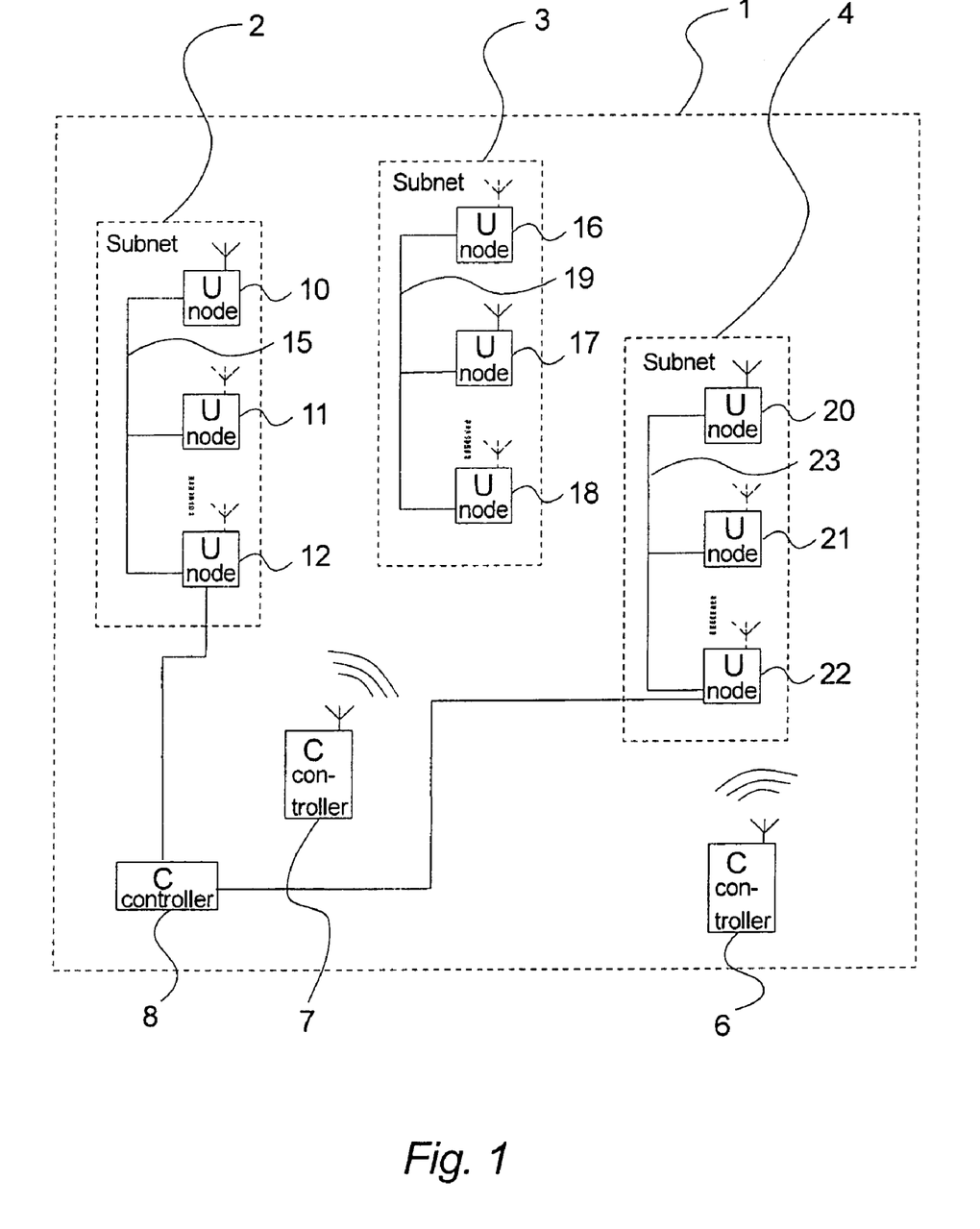
FIG. 1 shows a general overview of a system comprising a plurality of nodes and a number of subnets according to the invention.

FIG. 1 shows a general overview of a system according to an embodiment of the invention. The system is generally designated 1 and comprises a plurality of units or nodes 6, 7, 8, 10, 11, 12, 16, 17, 18, 20, 21, and 22. Some of these nodes, e.g. 6,7 and 8 are designed as controllers, e.g. control units by which it is possible to transmit control signals or other types of signals to one or more of the units or nodes U in the system.

The units or nodes 10, 11, 12, 16, 17, 18, 20, 21, and 22 are designed as controllable units or nodes, which are able to perform in response to a control signal or a similar form of received signal. Some or all of these units comprise radio frequency receiver/transceiver means as shown. These units or nodes are as illustrated located in subnets, e.g. 2, 3 and 4. A subnet includes at least one unit which comprises RF receiver or transceiver means. A subnet may have only one node, but normally it has a plurality of units, e.g. at least two. The actual number of nodes or units in a subnet will depend on the actual application, the actual physical location of the involved units and/or the utilization of the units. The units which are comprised in a subnet, which will also be referred to as a powerlink arrangement, will as shown be mutually connected via a bus system, e.g. 15, 19, and 23, respectively. This bus system may be a wired connection by which the units in a subnet may communicate with each other as explained in greater detail below.

It will be understood that a system may comprise more or less than the illustrated three subnets, e.g. one, two, four, etc. subnets or powerlink arrangements.

Two of the illustrated controllers C, e.g. 6 and 7 are designed as remote control units, which are equipped with radio frequency transmitters or transceivers in order to be able to communicate with the units U equipped with RF receivers or transceivers. A system according to the invention will have at least one controller which may communicate with the units via RF signaling etc.

However, a system may also comprise other types of controllers C, for example a controller 8, which will be able to transmit signals to one or more of the units U by e.g. wired means, e.g. by electric signaling, by means of infra red signaling, other means of optical signalling, electromagnetic signalling etc.

The operation of a system according to the invention will now be explained with reference to FIG. 2, which illustrates (part of) a system with a subsystem having only one unit U with RF receiving/transceiving means. The system includes one or more units or nodes 30, 31, 32, 33 (U1-Un) comprising or linked to, for example, drive units for various devices 35, 36, 37, 38. These devices may, for example, be activators of various types and used in a wide variety of applications, as explained in further detail later on. The units may also or instead comprise or be linked to assorted apparatus, measuring devices, indicating devices, controller etc. that need to receive information, control signals etc. at certain points of time. A common feature of the units 30, 31, 32, 33 is that it is necessary or advantageous to be able to send some sort of information, signal etc. to the units. Further, it may be necessary or preferable to be able to receive information or signals from the units, e.g. confirmation signals, acknowledge signals etc.

Figure 2:
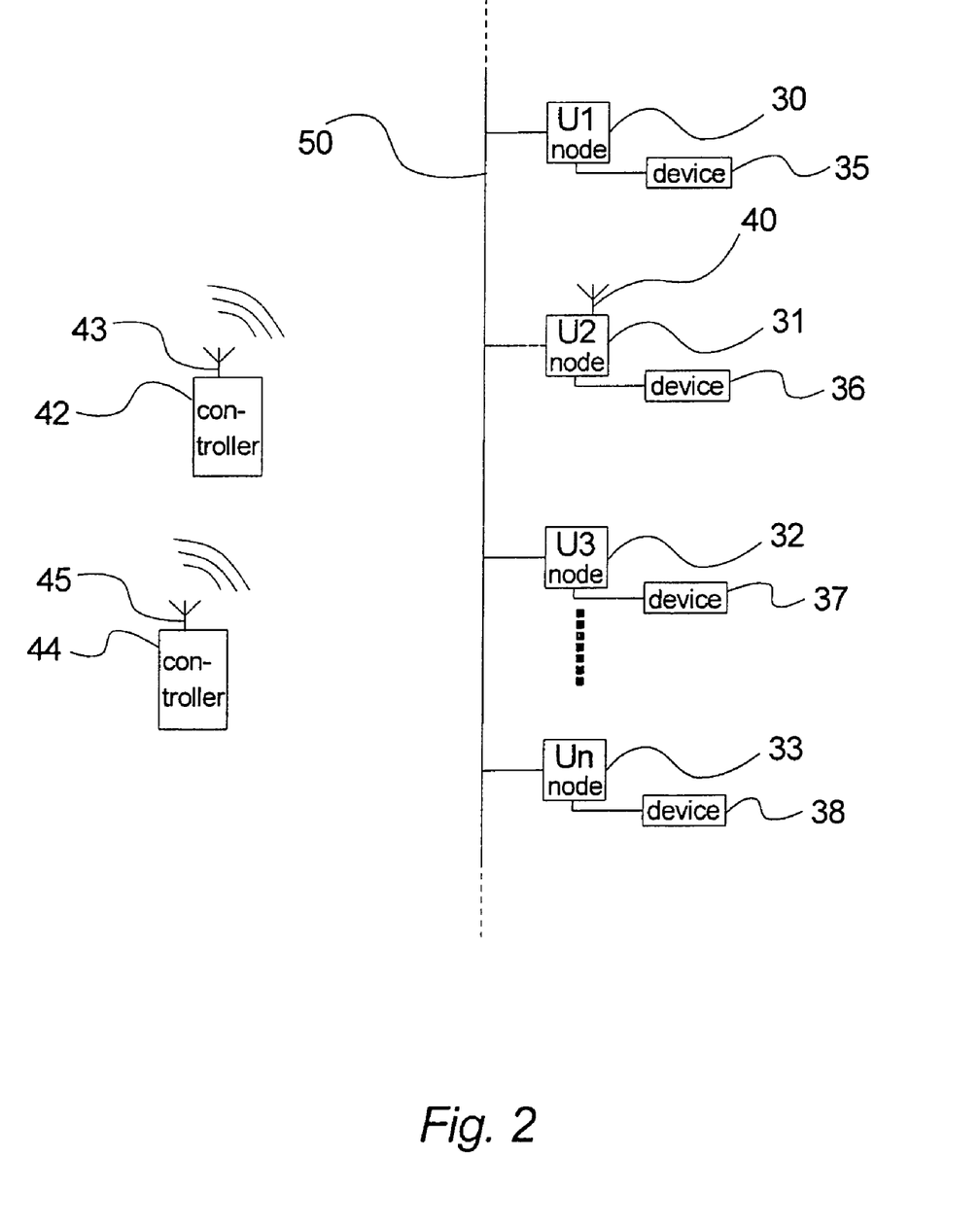
FIG. 2 shows a general overview of a system according to a first embodiment of the invention.

In the embodiment shown in FIG. 2, the unit 31 is equipped with receiving means for radio frequency signals, e.g. including antenna means 40. Each unit includes, e.g., a motor drive unit or a control unit and is connected to a driven or controlled member 35, 36, 37, 38. It will be understood that the means driven by, controlled by etc. the unit may be integrated with the unit.

The system further comprises a node in the form of a controller, e.g. a remote control unit 42 designed for transmission of signals by means of radio frequency transmission means, e.g. including antenna means 43. This remote control unit may be used for transmitting control signals or other types of signals to one or more of the units or nodes U1-Un in the system.

FIG. 2 further shows that the system can include at least one additional controller, e.g. a remote control 44, similar to the first remote control, e.g. designed for transmission of signals by means of radio frequency transmission means, e.g. including antenna means 45, or dissimilar to the first remote control, e.g. designed for transmission by other means such as wired means, infra red transmission means etc. as explained above.

The units 30, 31, 32, 33 are as illustrated and explained above connected by communication means 50 which is in the form of wired communication bus. The communication may be performed in accordance with a predefined protocol whereby the communication means 50 may serve to facilitate at least one function or service, or a combination of such functions or services, of a number of functions or services related to the operation of the system, e.g. regarding the reception and/or transmittal of signals, regarding the operation of the respective units etc. These functions or services and options thereof will be further described in the following.

When a signal is transmitted from a controller, e.g. a remote control, for example the remote control 42 in FIG. 2, the signal will in a first preferred embodiment be received by one of the units 30, 31, 32, 33 which is provided with the RF receiving means and which will be designated as a master unit, in the illustrated example, the unit 31. The received signal, e.g. a frame or data packet will include information, e.g. an address, regarding the destination node, e.g. the intended unit, and the master unit 31 will determine the addressee of each received signal.

If the addressee, i.e. the destination node is the master unit itself, it will act in accordance with the information included in the received signal. If the addressee is one of the other units, e.g. the unit 33, the master unit 31 will retransmit the received signal via the communication channel 50 and in accordance with the protocol for the communication. Each of the other units 30 will read the signal, but only the unit addressed in the signal, e.g. the unit 33, will receive the signal and act in accordance with the payload data information, e.g. a command, included in the signal.

The master unit, e.g. the unit 31 may comprise a table containing a list of addresses of all nodes or units comprised in the system, i.e. the subnet connected by the communication bus 50. This table is established when the subsystem is powered up. If such a table is established, the master unit will be able to determine whether the destination node(s) contained in a received signal, e.g. a received frame of a message, is located in the subnet associated with the master unit in question. If this is the case, the message will be retransmitted via the communication bus 50. If not, e.g. because the destination node is comprised in another subnet associated with the system, the message will not be retransmitted. If the destination node is the unit itself, i.e. the unit which received the RF-signal, the message will not be retransmitted either. The establishment of such a table may be omitted in which case all signals will be retransmitted, whereby unnecessary retransmittals may be performed, but whereby data processing and storage may be avoided/reduced.

A signal transmitted from a remote control, e.g. 42, may be addressed to more than one of the units in the system or even to all of these. In this case the signal will as described above be received by the master unit, e.g. 31 and the destination nodes, e.g. the intended receivers will be determined by the master unit. The signal may be retransmitted to the other units in question via the communication bus 50, and the commands included in the signal may be performed by the units in question.

In a modified embodiment the master unit, e.g. the unit equipped with RF receiving/transceiving means may be able to perform a sequential operation of the commands involved in a received signal. When a signal is received, the master unit will determine the intended receivers and possibly also the type of command(s) included in the signal, e.g. possibly related to each of the intended receivers. On the basis of this information, in accordance with the protocol and possibly in accordance with other predefined rules for the operation of the system in question the master unit may retransmit the signal, e.g. transmit individual signals comprising individual addresses and corresponding commands in a sequential order and possibly with individual and/or predetermined time intervals.

Further, the transmittal of the individual control signals may as mentioned be performed in accordance with specific rules. For example, when a given first signal has been retransmitted to a first unit, the transmittal of the next signal to a second unit may be performed in dependence on a signal from the first unit, e.g. a signal confirming receipt of the first signal, confirming that the command has been performed or a signal implying that the command has not been performed. The transmittal of the next signal may then be performed, possibly after a predetermined time interval. Other rules may be defined.

Further, the operation of the system in accordance with the communication protocol may include handling of control signals emitted from two or more remote controls and/or a plurality of control signals emitted from a single remote control, for example control signals transmitted when the system is actually performing operations relating to a preceding control signal, e.g. a control signal from the same remote control or from another remote control associated with the system.

In such circumstances the master unit, e.g. the unit equipped with RF receiving/transceiving means may perform the operations in accordance with predefined rules, which may be established with regard to the actual application and the actual needs. For instance, the master unit may of course complete current operations before investigating further received signal(s) and operating in accordance with these. Instead, the master unit may determine the address(es) and control content of a subsequently received signal and may, in accordance with pre-established rules, abort some or all of the current operation(s) and initiate some or all of the operations indicated by the subsequently received signal. This may for example be the case if the subsequently received signal demands an operation to be performed which is in contradiction to a current operation, e.g. in the case of a system comprising operable windows where a current operation involves the opening of at least one window and where a subsequent signal indicates the closing of at least the same window.

Figure 3:
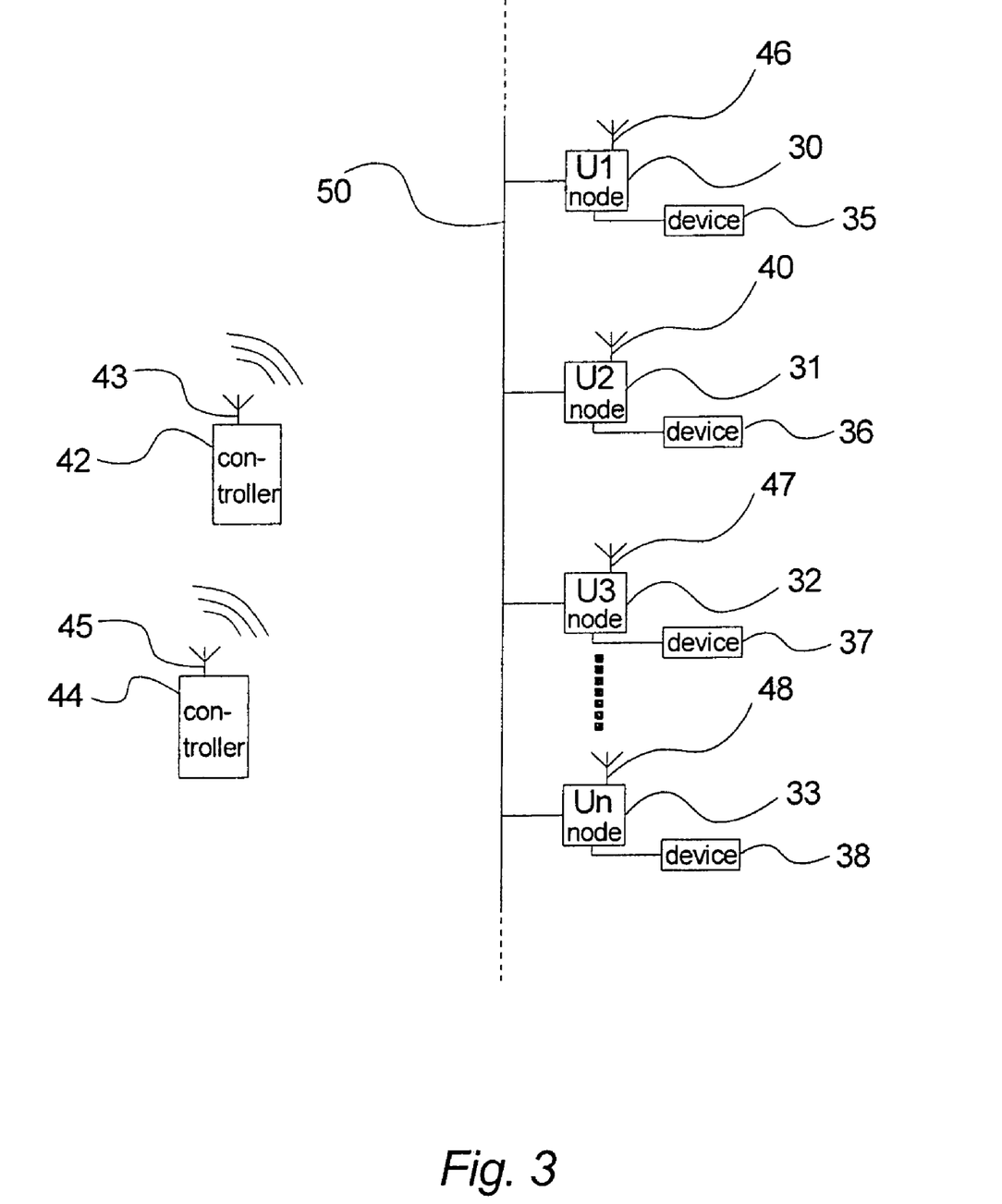
FIG. 3 shows a system according to another embodiment of the invention.

As shown in FIG. 3 more than one of the units or nodes 30-33 in a subnet or powerlink arrangement may comprise means, e.g. including antenna means 40, 46, 47, 48 for receiving control signals from e.g. remote controls 42, 44.

In this case the involved units, e.g. the units designed for receiving RF signals and connected to the same subnet, will operate on equal terms, i.e. none of these units will be designated as a master unit per se. The units equipped with RF receiving means will serve to help each other, since a signal transmitted from a remote controller will have a larger chance of being (correctly, e.g. checked by Cyclic Redundancy Check-CRC) received by at least one of these units than if only one unit in a subnet is able to receive RF control signals. This is of particular importance when the units in a subnet is placed in locations where dampening of RF signals may occur, e.g. caused by walls or other building structures, furniture, etc. and caused by the distances between the nodes, e.g. between a controller and a unit in a subnet. In these cases the transmitted control signal may be picked up by one of the units equipped with RF receiving means, e.g. the unit closest to the remote controller or located in a "free line of sight" in relation to the remote controller. The unit that receives the signal, will as previously described determine the destination node, check the address table for the destination address and retransmit the signal, e.g. the frame or data packet, if the destination node is associated with the subnet in question and if the destination node is not the unit itself. If the unit does not comprise an address table, the signal will be retransmitted via the communication bus 50 in all cases as explained above.

If, however, more than one of the units equipped with RF receiving means, e.g. RF-nodes receive an emitted control signal correctly (e.g. checked by Cyclic Redundancy Check-CRC), these units will all be prepared to retransmit the signal. According to the invention the RF nodes that have received a signal will randomly select a timeslot. A system according to the invention may for example operate with 32 timeslots, and each of the RF-nodes that have received a signal will pick one of these. When the respective timeslots occurs, the RF-nodes in question will initiate the retransmission via the communication bus 50. The RF node that have selected the lowest, i.e. the earliest occurring timeslot, will retransmit the signal, e.g. the frame or packet. The other RF-nodes (or-node) that also have received the signal, will detect that a transmission is occurring via the communication bus and will randomly pick a new timeslot number and will try to transmit when this timeslot occurs and when the communication bus is vacant.

If two (or more) RF nodes have selected the same timeslot number, they will try to transmit simultaneously. However, the system comprises a collision detection arrangement and in such cases the transmission will be aborted. The RF nodes trying to perform a retransmission of a received signal will each randomly select a new timeslot number, and a retransmission will be performed by the node that has selected the lowest timeslot number in analogy with what has been explained above. However, in order to reduce the chance of a new collision, the number of timeslots may be enlarged, for example doubled, when the new timeslot number is selected. This procedure may be repeated if a new collision occurs.

A node which is in the process of initiating or performing a transmission of a received signal, will abort the transmission if it is detected that the signal, e.g. a frame, that is to be transmitted, is received in e.g. a receiver buffer of the node. This will occur if another node already has retransmitted the signal, e.g. the frame with the same content, and in these cases the system according to the invention will prevent that a signal, e.g. a frame or a data packet, is needlessly retransmitted (one or more times in addition to the "original" retransmission).

It will be understood that the same process, e.g. the selection of a timeslot number etc. may also be performed by a RF node which is the only RF node associated with a subnet. Thus the RF nodes may be designed similarly, irrespective of the actual use.

When a destination node on a subnet has received a signal, e.g. a frame, a response, e.g. an acknowledgement, a measured value etc. normally has to be transmitted from the destination node back to the controller, e.g. the remote control unit. This response will according to the protocol for the communication be routed along the same route as the received signal, e.g. the control signal.

This may be illustrated with reference to FIG. 1. Supposing that the subnet 3 contains two nodes with RF receiving means, e.g. 16 and 17, and that a control signal is transmitted from the remote controller 6 with the unit 18 as the destination node. The signal is (correctly) received by e.g. the RF node 16 and retransmitted via the communication bus 19 to the node 18. A response signal from the node 18 will be routed via the RF node 16 back to the remote controller 6. Since the control signal was received by the RF node 16 instead of the RF node 17, it may be expected that transmission between the node 16 and the controller 6 will again lead to a positive result, and thus a relatively high transmission success rate for the response signals back to the remote controllers may be expected.

The embodiment illustrated in FIG. 3. will have the advantage that a control signal emitted by a remote control from a position giving inadequate reception at the position of a unit equipped with RF receiving means, e.g. 31 may be received by another unit, e.g. 31, 32, 33 instead, whereby it is assured that a system according to the described embodiment will have improved reception of control signals in cases where the remote control, or rather the remote control operated by a user, is situated far from the one or more of the units or at a place giving a reduced transmission.

Figure 4:
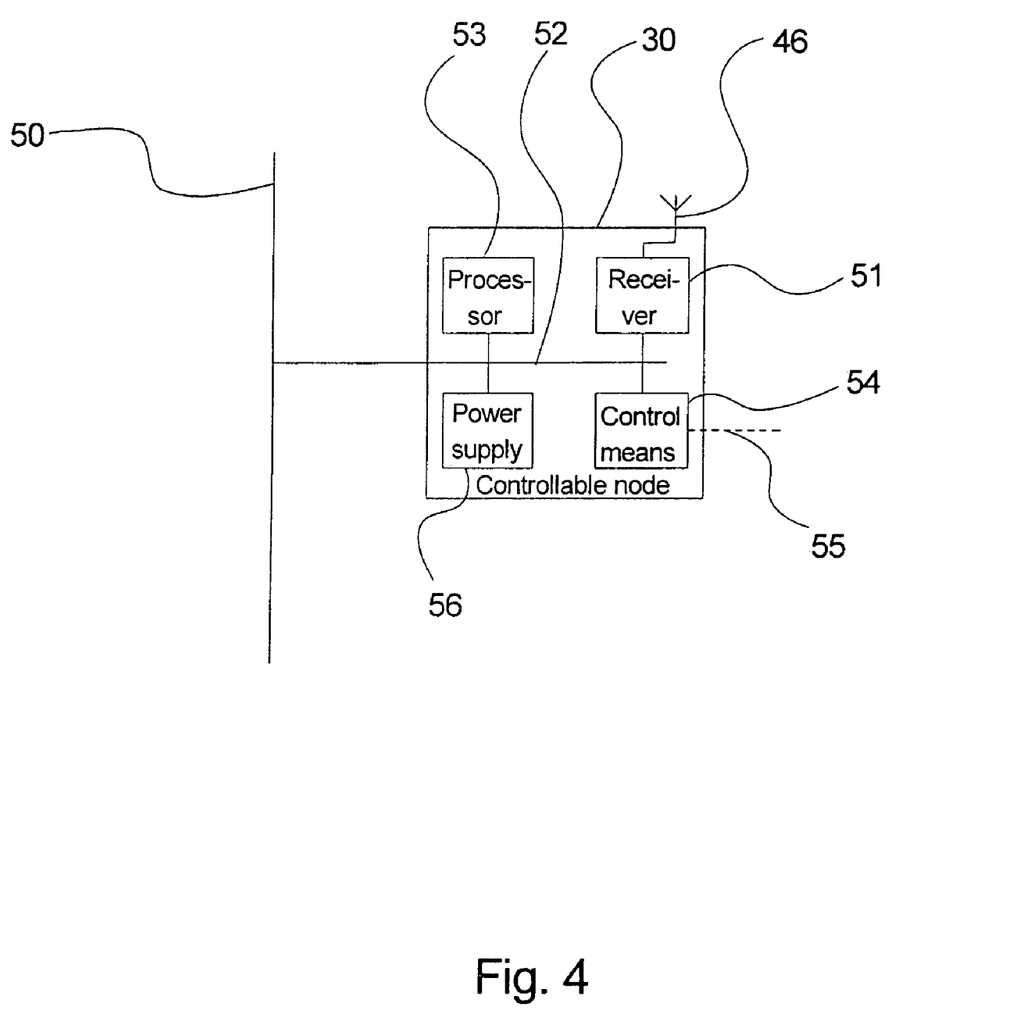
FIG. 4 shows a receiver unit for use in connection with an embodiment of the invention.

A controllable unit or node, e.g. 10, 11, 12, 16, 17, 18, 20, 21, 22 according to the invention will be described in further detail with reference to FIG. 4, where a controllable unit or node is generally designated 30 and where the main parts of an embodiment of a controllable unit according to the invention are illustrated. As described above, this unit comprises antenna means 46 connected to receiver or preferably transceiver means 51 for reception of control signals. It will be understood that according to the invention wired means may be used additionally for transmitting control signals to the unit 30 if found applicable. The receiver/transceiver means 51 is connected to an internal bus 52 for connection to e.g. processor means 53, control means 54 and power supply means 56. The processor means 53 is designed and/or programmed to perform in accordance with the protocol according to the invention and in accordance with user-specified and/or application-specific conditions, including control of the communication via the communication bus 50. The control means 54 is designed to perform the required operations, e.g. control, interrogation etc. and may be connected by means of wire, wireless transmission etc. 55 to various devices (not shown in FIG. 4). The power supply means 56 may be designed in various manners, which will be evident to a skilled person, e.g. as battery supply, as a mains fed transformer supply, as a local DC-power supply, e.g. a 24V power supply, as a solar cell power supply, and combinations of these and other known power supply systems. Further, it will be understood that the power supply 56 may also supply power to the control and operation of the various devices connected to the unit.

Figure 5:
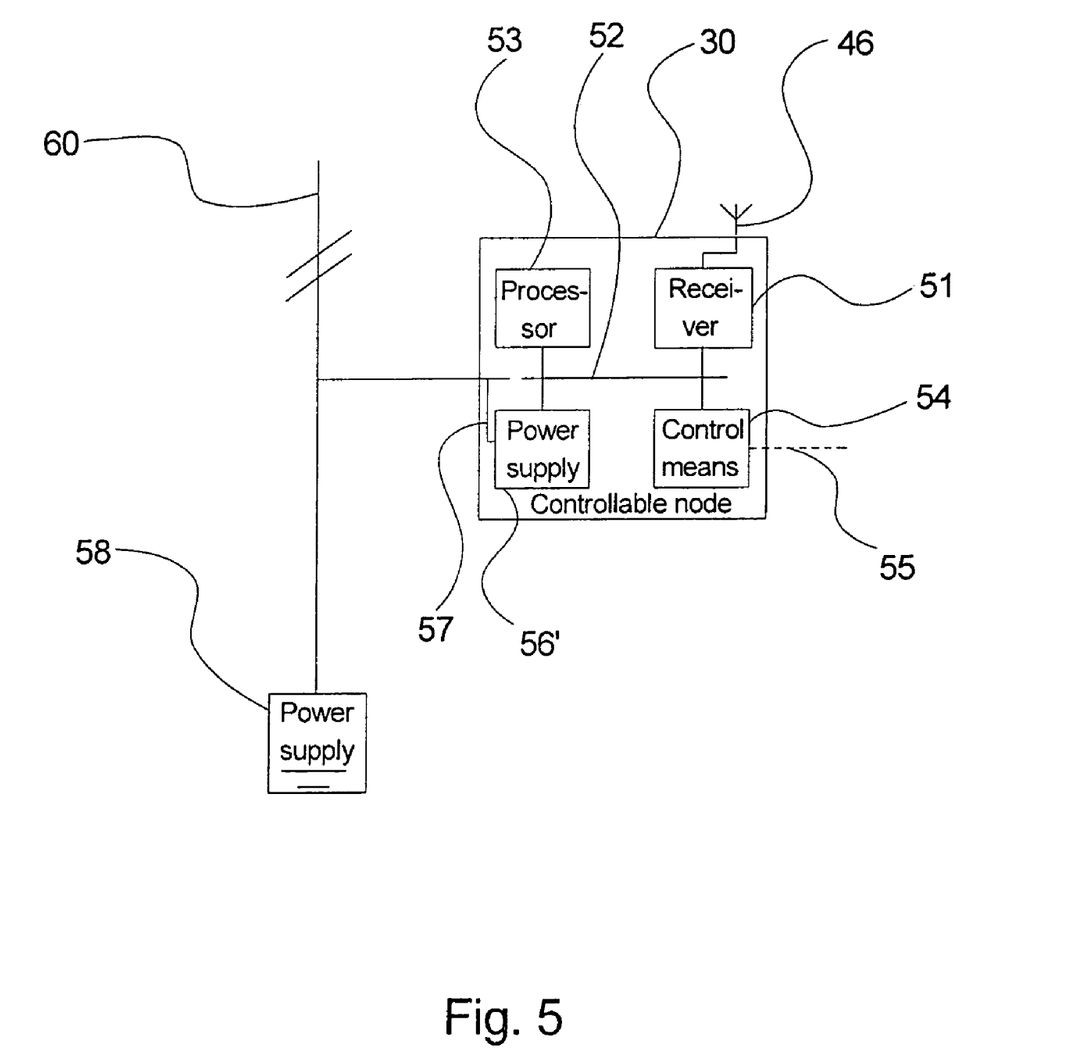
FIG. 5 shows a further receiver unit for use in connection with a further embodiment of the invention.

A further embodiment of the controllable unit or node according to the invention is illustrated in FIG. 5. As described above, the unit comprises antenna means 46, receiver means 51, an internal bus 52, processor means 53, control means 54 and a power supply 56'. The power supply 56', however, is fed with power via a connection part 57 from a common power supply bus 60, e.g. a two-cord cable or the like, connected to a power supply unit 58 which may be common to all units or nodes in a subnet or powerlink arrangement according to the invention. This power supply bus 60 also serves as a communication bus for the communication between the controllable units or nodes comprised in a subnet or powerlink arrangement according to the invention. The communication may be performed in a number of ways, which will be obvious to a skilled person, e.g. as modulated communication, super positioned communication etc. The power supply 56' may provide the link between the unit 30 and the communication bus/power supply bus 60 via the connection part 57, thus operating as filtering means for transferring communication signals to/from the internal bus 52.

Figure 6:
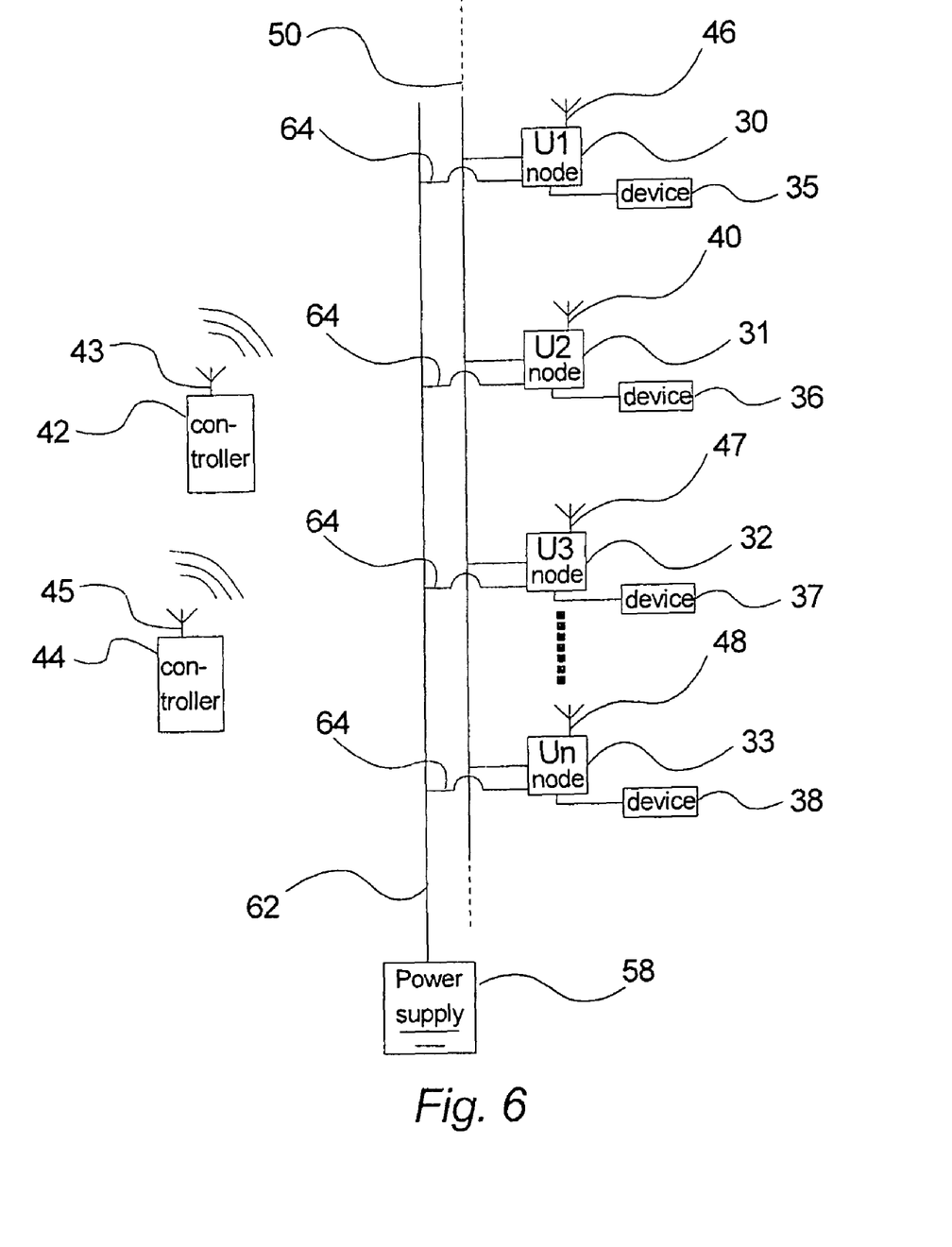
FIG. 6 shows a system according to a still further embodiment of the invention illustrated in a manner corresponding to FIGS. 2 and 3.

Finally, a further embodiment shall be described with reference to FIG. 6, which shows a system comprising a subnet or a powerlink arrangement according to the invention in a manner corresponding to FIGS. 2 and 3.

Here, the communication between the controllable units 30-33 according to the invention is performed via a separate and designated communication bus 50, which may perform its operation by means of wired means. Further, it is shown that the power supply to units 30-32 and preferably also the associated devices 35-38 is provided by means of a central/local power supply 58 connected via a power supply bus 62 and connections 64 to the respective units/nodes/devices.

Further, according to an embodiment of the invention, the described method and system may be utilized for monitoring and/or controlling the power consumption and/or demand or other (limited) resources related to the operation of the system, which will be explained in further detail in the following.

The power available from e.g. the power supply unit 58 will in practice be limited, e.g. in view of peak current, rated power value etc, of the power supply unit and the wiring. Thus, it will be understood that if e.g. two electric motors providing the operative power for two of the devices 35-38 are operated simultaneously, the power supply and the wiring will have to be designed and rated in correspondence with this and it will be understood that savings may be achieved if such simultaneous loads can be avoided.

In accordance with an important aspect of the invention, a node on a subnet may be designated as a resource master, e.g. in order to control consumption of a scarce and/or limited resource. Such a resource may for example be the available power, cf. what has been explained above, but other types of resources may be the objects of the resource master control according to this embodiment of the invention.

The node that is designated the resource master is selected in accordance with a predefined rule, e.g. the node having the lowest or the highest address on the subnet. Other means of designating a node as resource master may be utilized which will be obvious to a skilled person.

When a node on the subnet has received a command implying that an amount of the limited resource, e.g. the operating of an electric motor demanding a current of e.g. 1 A, will have to be provided to the node, the node in question will have to send a request to the resource master via the communication bus. The resource master will determine the available resource, e.g. in view of other nodes using the resource at the same time or requesting to use the resource at the same time. If the demanded resource is available, the resource master will respond to the requesting node, that the required resource may be used. If the demanded amount of the resource is not available, the requesting node will be told to wait. When the required resource becomes available, the resource master will tell the requesting node that it may now initiate the operation.

However, the request from a node may also comprise a priority, whereby the resource master, if other nodes are currently using resource, e.g. power, for operations with lower priority, may abort one or more of these lower prioritized operations, this making the required amount of the resource available to the node with the higher prioritized request. When the higher prioritized operation is completed, the resource master will indicate to the node or nodes, which had the operations aborted that they may proceed with these since the demanded power will now again be available. The priority will be related to the actual operation that the requesting node wishes to perform, and not the node itself. For example, a node requesting to use power for closing a window because a rain sensor has indicated that it is raining, may have a higher priority than a node requesting power for the operation of a window blind etc.

It will be understood that if such a power consumption control (or control of another resource) is to be performed, the system or the subnet in question will need to contain a table comprising a listing of the addresses of the units in a subnet and possibly other information, e.g. rated power consumption, functionality of associated controlled device etc. Further it will be understood that the communication bus will provide means for communicating requests, control signals and responses from the resource master and that all nodes connected to the same source of resource will be controlled by the resource master, e.g. all nodes on a subnet.

When operating the devices, etc. associated with the controllable units, certain security or safety aspects may be involved, for example whether a particular remote control may perform e.g. an unlocking of a door, opening of a window etc. In such circumstances, the system according to the invention may be configured to provide that the decision whether a particular device may be operated upon reception of a certain control signal from a particular controller is placed at the destination node. Thus, the security level and parameters will be determined by the set up of the controllable node operating a particular device, and the transmission and retransmission will be insensitive of such security and/or safety aspects.

The invention has been described above in general, but it will be understood that the invention may be particularly advantageous in connection with remote control of devices related to buildings, homes, etc. where obstructions for a transmission of RF signals may be present. Such devices may be e.g. controlled aperture members such as operable windows, doors etc., having a member which may be opened and closed. Further, the invention may be utilized in connection with any member associated with e.g. a window, a door or a similar aperture member of a building, where it is desired and/or advantageous to be able to operate a movable member such as a curtain, blinds etc.

It will also be understood that the invention is not limited to the particular examples described above but may used in connection with a wide variety of applications. Further, it will be understood that the system according to the invention may be designed in a multitude of varieties within the scope of the invention as specified in the claims.

The invention claimed is:

1. A method of operating a device, including a destination node linked to non-destination nodes, the method comprising:
    receiving a transmission signal by one or more of the non-destination nodes;
    detecting a first part of the transmission signal that identifies the destination node;
    selecting a timeslot for each of the one or more of the non-destination nodes to perform a retransmission of at least a second part of the transmission signal to the destination node;
    performing the retransmission to the destination node by the non-destination node for which an earliest occurring timeslot has been selected; and
    aborting a secondary retransmission from any of the non-destination nodes, for which a later occurring timeslot has been selected, upon a reception of the retransmission signal by the destination node.

2. The method according to claim 1, further comprising determining a timeslot in which the performing of the retransmission occurs.

3. The method according to claim 1, wherein the selecting of the timeslot is accomplished at random.

4. The method according to claim 1, wherein the first part of the transmission signal includes identification information relating to the destination node.

5. The method according to claim 4, wherein the identification information comprises an address of the destination node.

6. The method according to claim 1, wherein the performing of the retransmission is performed via a wired communication bus.

7. The method according to claim 1, wherein the transmission signal is received from a wireless radio frequency (RF) remote control.

8. The method according to claim 1, further comprising:
transmitting a response signal from the destination node, the response signal including one of an acknowledgement, a request, a measured value or combinations thereof; and
routing the response signal in accordance with a routing of the transmission signal.

9. The method according to claim 1, wherein the transmission signal is selected from the group consisting of a control signal, a request signal, an interrogation signal and/or combinations thereof.

10. A system to provide for a transmission of signals, the system comprising:
a device, including a destination node;
non-destination nodes to which the destination node is linked, the non-destination nodes being configured to receive a signal, to detect a first part of the signal identifying the destination node, to select a respective timeslot in which each of the non-destination nodes is scheduled to perform a retransmission of at least a second part of the signal, to perform the retransmission by the non-destination node for which an earliest occurring timeslot has been selected, and to abort a secondary retransmission from any of the non-destination nodes, for which a later occurring timeslot has been selected, upon a reception of the retransmission by the destination node.

11. The system according to claim 10, further comprising:
controllable units, including pluralities of the non-destination nodes, each associated with respective devices; and
at least one communication bus, which defines a subnet in the system and which is linked to at least one of the non-destination nodes, wherein the transmission of the signals to or from the subnet is performed by a radio frequency (RF) transmitter.

12. The system according to claim 10, wherein the non-destination nodes each comprise a means for identifying the first part of the signal.

13. The system according to claim 10, wherein the non-destination nodes each comprise a means for initiating the retransmission.

14. The system according to claim 10, further comprising a remote controller to transmit the signals to the destination node.

15. The system according to claim 10, further comprising a communication bus across which the destination node and the non-destination nodes are linked, the communication bus including a wired communication channel.

16. The system according to claim 10, further comprising a means for establishing and storing a table including identification information relating to the destination node.

17. The system according to claim 10, further comprising a power supply connected to the destination node and the non-destination nodes.

18. The system according to claim 17, further comprising a communication bus across which the destination node and the non-destination nodes are linked, the communication bus including a communication channel configured to operate in accordance with a modulation or a superimposition thereof.

19. The system according to claim 10, wherein the destination node and/or at least one of the non-destination nodes each comprises a control means, including a means for keeping account of available resources, a means for accepting or denying requests from the destination node and/or the non-destination nodes, a means for aborting operations, a means for valuating requests and the operations, and/or combinations thereof.

20. The system according to claim 10, wherein the non-destination nodes comprise transceivers configured to respond to received signals by transmitting a response signal including an acknowledgement, a request, a measured value or combinations thereof.

21. A system for controlling a device, the system comprising:
a communication bus having a plurality of controllable nodes connected thereto;
a controllable device in communication with the controllable nodes;
a controller configured to transmit a signal to the controllable nodes, with the controllable nodes being configured to detect a destination signal embedded in the signal and to select a timeslot in which each of the controllable nodes is scheduled to retransmit at least a portion of the signal, a retransmission of the portion of the signal being performed by the controllable node for which an earliest occurring timeslot has been selected; and
a destination node in communication with the communication bus and identified by the destination signal, such that any of the controllable nodes, for which later occurring timeslots have been selected, which receive the destination signal, abort a retransmission therefrom when the destination node receives the destination signal.

22. The system according to claim 21, wherein the controllable device and the controller are wirelessly linked to the controllable nodes and to the destination node.

23. The system according to claim 21, wherein the controllable device and the controller are hard-wired to the controllable nodes and the destination node.

24. The system according to claim 21, further comprising a plurality of controllable devices, wherein the destination signal designates a specific controllable device for control.

25. The system according to claim 21, wherein the signal, the destination signal and the response signal are transmitted during predefined timeslots to avoid interference.

26. The system according to claim 21, wherein the destination node is identified by a priority value, an address, a radio frequency, a response value, and/or combinations thereof.

27. The system according to claim 21, wherein the controllable device and the destination node each transmit the response signal in a random timeslot.

28. The system according to claim 21, wherein the destination signal comprises a control signal to control the controllable device.

* * * * *

UNITED STATES PATENT AND TRADEMARK OFFICE
CERTIFICATE OF CORRECTION

PATENT NO. : 8,054,768 B2  
APPLICATION NO. : 12/042859  
DATED : November 8, 2011  
INVENTOR(S) : Martin Sandal Nielsen et al.

Page 1 of 1

It is certified that error appears in the above-identified patent and that said Letters Patent is hereby corrected as shown below:

Title page, Item (75) Inventors:  
First Inventors last name should read --Nielsen--.

Signed and Sealed this  
Tenth Day of July, 2012

David J. Kappos  
*Director of the United States Patent and Trademark Office*